US007627681B2

(12) United States Patent
Nog et al.

(10) Patent No.: US 7,627,681 B2
(45) Date of Patent: Dec. 1, 2009

(54) RELAYING MESSAGES THROUGH A FIREWALL

(75) Inventors: Saurab Nog, Sammamish, WA (US); Alfred McClung Lee, IV, Seattle, WA (US); Cesar M. Ruiz-Meraz, Redmond, WA (US); Umesh Madan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 687 days.

(21) Appl. No.: 11/185,347

(22) Filed: Jul. 20, 2005

(65) Prior Publication Data

US 2007/0022164 A1 Jan. 25, 2007

(51) Int. Cl.
*G06F 15/16* (2006.01)
(52) U.S. Cl. .................. 709/228; 709/206; 709/227; 709/230
(58) Field of Classification Search .......... 709/206, 709/227, 228, 230
See application file for complete search history.

(56) References Cited

U.S. PATENT DOCUMENTS

| 6,003,084 | A | * | 12/1999 | Green et al. ............... 709/227 |
| 6,104,716 | A | * | 8/2000 | Crichton et al. ............ 370/401 |
| 6,421,733 | B1 | * | 7/2002 | Tso et al. ................... 709/246 |
| 6,643,701 | B1 | * | 11/2003 | Aziz et al. ................. 709/227 |
| 7,003,799 | B2 | * | 2/2006 | Jorgenson .................... 726/12 |
| 7,028,051 | B1 | * | 4/2006 | McMullan et al. ....... 707/104.1 |
| 7,212,962 | B2 | * | 5/2007 | Masushige et al. ......... 703/24 |
| 7,213,263 | B2 | * | 5/2007 | Makineni et al. ............. 726/11 |
| 7,227,864 | B2 | * | 6/2007 | Collins et al. .............. 370/392 |
| 7,360,075 | B2 | * | 4/2008 | VanHeyningen et al. ... 713/151 |
| 7,389,328 | B2 | * | 6/2008 | Yeung et al. ................ 709/218 |
| 2002/0112152 | A1 | * | 8/2002 | VanHeyningen et al. ... 713/151 |
| 2002/0143855 | A1 | * | 10/2002 | Traversat et al. ........... 709/202 |
| 2002/0152299 | A1 | * | 10/2002 | Traversat et al. ........... 709/223 |
| 2003/0061361 | A1 | * | 3/2003 | Bacik et al. ................ 709/228 |
| 2003/0074413 | A1 | * | 4/2003 | Nielsen et al. ............. 709/206 |
| 2003/0229900 | A1 | * | 12/2003 | Reisman ..................... 725/87 |
| 2005/0033985 | A1 | * | 2/2005 | Xu et al. .................... 713/201 |
| 2005/0060376 | A1 | * | 3/2005 | Moran ....................... 709/206 |
| 2005/0125503 | A1 | * | 6/2005 | Iyengar et al. ............. 709/213 |
| 2005/0125532 | A1 | * | 6/2005 | Kimchi ...................... 709/225 |
| 2006/0041896 | A1 | * | 2/2006 | Yagi .......................... 719/330 |
| 2006/0155842 | A1 | * | 7/2006 | Yeung et al. ............... 709/224 |
| 2006/0168023 | A1 | * | 7/2006 | Srinivasan et al. ......... 709/206 |
| 2006/0274899 | A1 | * | 12/2006 | Zhu et al. .................. 380/281 |
| 2007/0019622 | A1 | * | 1/2007 | Alt et al. .................... 370/352 |
| 2007/0019623 | A1 | * | 1/2007 | Alt et al. .................... 370/352 |
| 2007/0022164 | A1 | * | 1/2007 | Nog et al. .................. 709/206 |
| 2007/0136413 | A1 | * | 6/2007 | Ishikawa et al. ........... 709/200 |

* cited by examiner

*Primary Examiner*—Saleh Najjar
*Assistant Examiner*—Waseem Ashraf
(74) *Attorney, Agent, or Firm*—Workman Nydegger (57) ABSTRACT

The present invention extends to methods, systems, and computer program products for relaying messages through firewalls. A message relay negotiates first communication parameters with relay components inside a firewall and (potentially different) second communication parameters with applications outside the firewall. The message relay receives a message from an outside application in accordance with the second negotiated parameters and maps an electronic address in the received message to an inside application. The message relay transforms the message and sends the transformed message over an established connection through the firewall to a relay component in accordance with the first negotiated parameters. The relay component receives the transformed message and transforms the transformed message back into the message. The relay component delivers the message to the inside application in accordance with the second negotiated parameters.

15 Claims, 4 Drawing Sheets

RELAYING MESSAGES THROUGH A FIREWALL

CROSS-REFERENCE TO RELATED APPLICATIONS

Not applicable.

BACKGROUND OF THE INVENTION

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks (e.g., the Internet) over which the computer systems and other electronic devices can transfer electronic data. As a result, many tasks performed at a computer system (e.g., voice communication, accessing electronic mail, controlling home electronics, Web browsing, and printing documents) include the exchange of electronic messages between a number of computer systems and/or other electronic devices via wired and/or wireless computer networks.

However, transmitting and storing information on computer networks, and especially the Internet, raises various security issues. Any computer system using the Internet to store or transfer information is vulnerable to attack from all other computer systems on the Internet. As a result, many entities want to utilize the benefits of the Internet while still protecting their data and computer systems from attack. To meet the need for security on the Internet, a variety of products have been developed.

One product in particular is the "firewall." Firewalls are used to monitor communication between computer networks. If a firewall detects communication that might be a security risk, the firewall blocks the communication. Firewalls are often used to protect an entity's private network from exposure to the security risks inherent in communication over the Internet. In operation, a private network sits "inside" the firewall. When communication that might pose a security risk to the private network is detected from a device "outside" the firewall, for example from the Internet, the communication is blocked.

Firewalls are therefore advantageous for shielding a private network from harmful communication originating on the Internet. Firewalls can be configured to block communication based on various criteria, including content of the communication and originating address of the communication. It may also be the case that a firewall is configured to block content depending on the protocol that is used. For instance, when using a connection-oriented protocol (like TCP), the firewall is configured to communicate with clients inside the firewall that plan on sending data to, and receiving data from, a machine outside the firewall. In these environments, the firewall acts more like a proxy server, where the firewall establishes a connection with an outside server, on behalf of the client machine, while protecting the identity of the internal machine from the external server. However, when using a connectionless-protocol (like UDP) this security functionality is disabled. Thus, many private networks use firewalls to block communication using connectionless protocols in order to protect the private network.

However, a disadvantage of using firewalls to block communication is that firewalls can prevent useful communication, for example, communication from a computer system outside the firewall that legitimately needs to send communications to a device inside the firewall. For example, a firewall can block communication from one portion of a distributed application (e.g., a Web service) outside the firewall from entering a private network that includes another portion of the distributed application. However, it is important with the ever-increasing number of applications exchanging data on the Internet, that a computer system inside a firewall receives legitimate communication from computer systems outside the firewall.

As previously described, at least to some extent, firewalls can be configured to permit some external communication to pass through to computer systems inside the firewall. For example, a firewall can be configured such that communication to a specified port, for example, port 80, is permitted to pass through the firewall. Thus, a firewall can be configured to permit access to Web based data (e.g., for purposes of Web browsing) on computer systems inside the firewall.

However, as the number and complexity of services inside a firewall increase, maintaining an appropriate firewall configuration becomes more difficult. For example, there may be tens or even hundreds of computer systems inside a firewall and each computer system may include a significant number of services. Communication to different services inside the firewall can be facilitated via various different port numbers. Some of the services may need to accept communication from outside the firewall and other services may not need to accept communication from outside the firewall. Thus, ports for services that need to accept communication from outside the firewall must be configured to allow such communication. On the other hand, ports for services that do not need to accept communication from outside the firewall must be configured to block such communication.

Based on changing operational requirements, the needs of services to accept or not accept communication from outside the firewall can change over time. The firewall may need to be reconfigured each time a new service is added and each time a service's need to accept communication from outside the firewall changes. Accordingly, maintaining an appropriate firewall configuration to satisfy the communication needs of services inside the firewall, while at the same time insuring the security of the services inside the firewall, can consume significant administrator resources.

BRIEF SUMMARY OF THE INVENTION

The foregoing problems with the prior state of the art are overcome by the principles of the present invention, which are directed towards methods, systems, and computer program products for relaying messages through a firewall. A message relay outside a firewall and a relay component inside the firewall, which receives messages for an inside application inside the firewall (e.g., a first portion of a Web service), negotiate first communication parameters. The message relay and an outside application outside the firewall (e.g., a second portion of the Web service) negotiate second communication parameters. The message relay receives a message from the outside application in accordance with the second negotiated parameters.

The message relay maps an electronic address in the received message to the inside application. The message relay transforms the message into a transformed message that can be transferred in accordance with the first negotiated parameters. The message relay sends the transformed message over an established connection through the firewall to the relay component in accordance with the first negotiated parameters.

The relay component receives the transformed message over the established connection through the firewall in accordance with the first negotiated parameters. The relay component transforms the transformed message back into the message sent by the outside application. The relay component delivers the message to the inside application in accordance with the second negotiated parameters. The inside application receives the message in accordance with the second negotiation parameters such that it appears to the inside application that the inside application is in direct communication with the outside application.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention provide for enforcing device settings for relaying messages through a firewall. A message relay outside a firewall and a relay component inside the firewall, which receives messages for an inside application inside the firewall (e.g., a first portion of a Web service), negotiate first communication parameters. The message relay and an outside application outside the firewall (e.g., a second portion of the Web service) negotiate second communication parameters. The message relay receives a message from the outside application in accordance with the second negotiated parameters.

The message relay maps an electronic address in the received message to the inside application. The message relay transforms the message into a transformed message that can be transferred in accordance with the first negotiated parameters. The message relay sends the transformed message over an established connection through the firewall to the relay component in accordance with the first negotiated parameters.

The relay component receives the transformed message over the established connection through the firewall in accordance with the first negotiated parameters. The relay component transforms the transformed message back into the message sent by the outside application. The relay component delivers the message to the inside application in accordance with the second negotiated parameters. The inside application receives the message in accordance with the second negotiation parameters such that it appears to the inside application that the inside application is in direct communication with the outside application.

Embodiments within the scope of the present invention include computer-readable media for carrying or having computer-executable instructions or data structures stored thereon. Computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system. Computer-executable instructions comprise, for example, instructions and data which cause a general-purpose computer system or special-purpose computer system to perform a certain function or group of functions. Computer executable instructions may be, for example, binaries, intermediate format instructions such as assembly language, or even source code.

In this description and in the following claims, a "network" is defined as one or more data links that enable the transport of electronic data between computer systems and/or modules. Local Area Networks ("LANs"), Wide Area Networks ("WANs") and the Internet are examples of networks.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1:
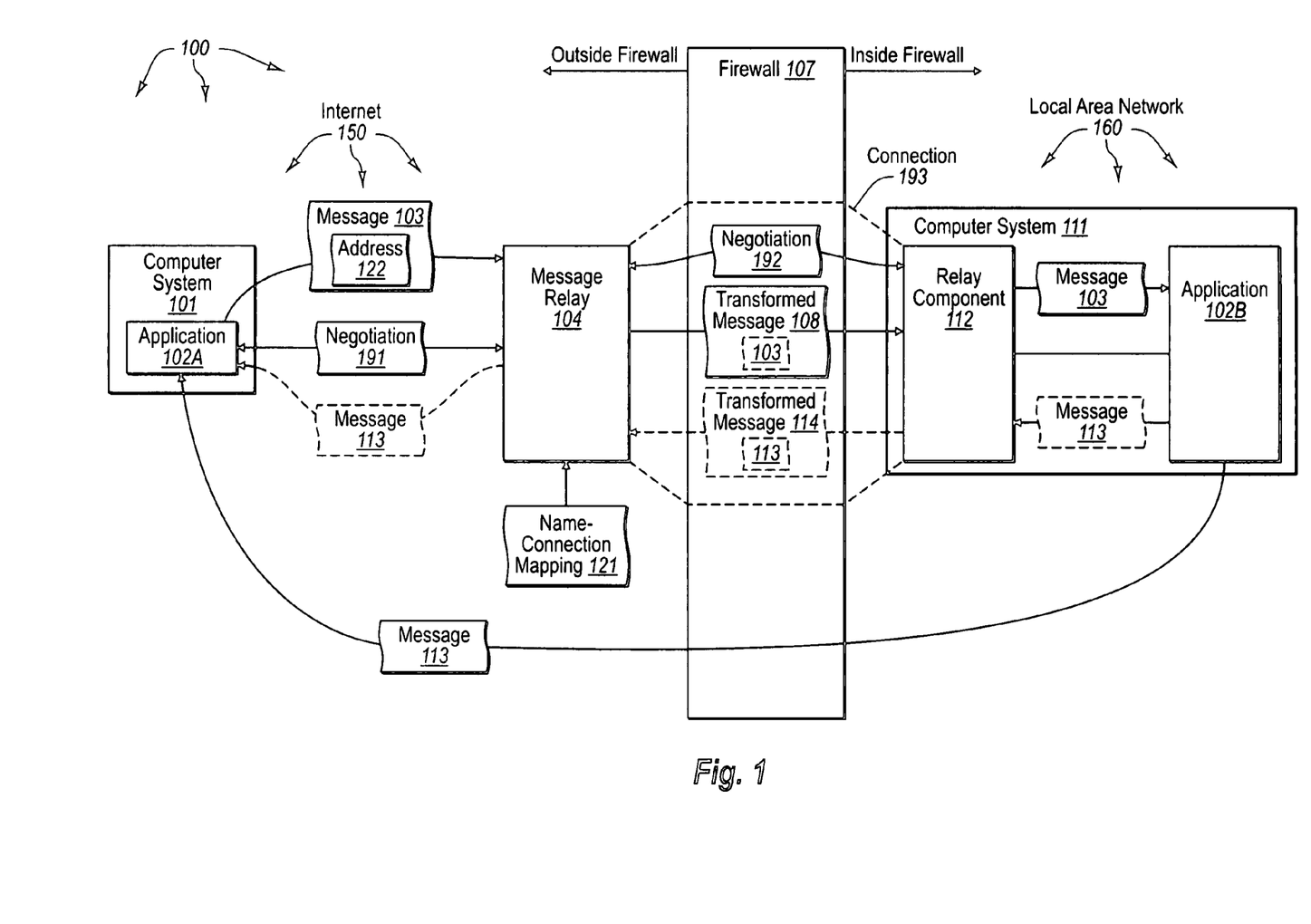
FIG. 1 illustrates an example of a computer architecture that facilitates relaying messages through a firewall.

FIG. 1 illustrates an example of a computer architecture 100 that facilitates relaying messages through a firewall. Depicted in computer architecture 100 is computer system 101, message relay 104, firewall 107, and computer system 111. Generally, computer system 101, message relay 104, firewall 107, and computer system 111 can be inter-connected via one or more networks, such as, for example Local Area Networks ("LANs"), Wide Area Network ("WANs"), and even the Internet. Accordingly, computer system 101, message relay 104, firewall 107, and computer system 111, as well as other connected computer systems, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the networks.

Generally, computer system 101 and message relay 104 can be included in Internet 150. Computer system 111 can be included in LAN 160. Firewall 107 can be a network boundary device situated between Internet 150 and LAN 160. Thus, firewall 107 can be configured to generally block inbound communications from Internet 150 to LAN 160 (e.g., communication from computer system 101 to computer system 111) to increase the security of LAN 160. Accordingly, computer system 101 and message relay 104 can be viewed as being "outside" firewall 107. On the other hand, computer system 111 can be viewed as being "inside" the firewall.

Computer system 101 includes application 102A and computer system 111 includes application 102B. Applications 102A and 102B can be portions of a distributed application (e.g., a Web service). Thus, from time to time, application 102A may initiate communication with application 102B and vice versa. Communication between application 102A and application 102B can include the exchange of SOAP messages containing eXstensible Markup Language ("XML") infosets.

Message relay 104 is a message level relay configured to receive inbound messages and relay inbound messages (e.g., that would otherwise be blocked at firewall 107) through firewall 107 to applications included in LAN 160. Message relay 104 can negotiate communication parameters, such as, for example, encoding parameters (e.g., UTF-8, UTF-16, plain text, binary, etc.), compression parameters, encryption parameters, transfer protocol parameters (e.g., TCP, HTTP, SMTP, UDP, MSNQ, etc.), security parameters (e.g., SSL), ordering guarantee parameters (e.g., at least once, only once, etc.), etc., that are to be used when message relay 104 exchanges SOAP messages with other components of computer architecture 100. For example, application 102A and message relay 104 can negotiate communication parameters that are to be used when application 102A sends a message to message relay 104. Similarly, message relay 104 and relay component 112 can negotiate communication parameters that are to be used when message relay 104 relays a SOAP message through firewall 107 to relay component 112.

Message relay 104 can be configured to transform communication parameters corresponding to a SOAP message for compatibility between different applications and components. Thus, message relay 104 can be configured to transform encoding parameters, compression parameters, encryption parameters, transfer protocol parameters, security parameters, ordering guarantee parameters, etc. For example, message relay 104 can receive a SOAP message from computer system 101 using an HTTP transport and then relay the message through firewall 107 to relay component 112 using a TCP transport. Other parameters can also be transformed. That is, message relay 104 can add, remove, or change, encoding parameters, compression parameters, encryption parameters, security parameters, ordering guarantee parameters associated with a message. For example, message relay 104 can transform a UTF-8 encoded SOAP message into a UTF-16 encoded message, change an encryption algorithm, etc.

In some embodiments, message transformation includes encapsulating a received message within another message. Generally, message encapsulation includes wrapping (at least a portion of) a first message in a second message. When the first and second messages are SOAP messages, it may be that one SOAP message is encapsulated in another SOAP message.

When encapsulating an inner XML element (e.g., a first SOAP message) inside another XML element (e.g., a second SOAP message), the inner or wrapped XML element can be encoded (or serialized) according to a wrapping algorithm. Various encoding techniques, such as, for example, binary and text encoding can be used. In some embodiments, wrapping algorithms utilize base 64 binary encoding to encode wrapped XML elements. An XML element, such as, for example, nq:WrappedXmlBase64, can be used to indicate the encoding type of an encoded XML element. An encoded XML element can also have a corresponding attribute, such as, for example, nq:ContentType, that defines the original content type. Thus, wrapping facilitates the encapsulation of a (binary or text) encoded SOAP envelope inside another SOAP envelope.

An unwrapping algorithm can decode (or deserialize) an encoded XML element. For example, an unwrapping algorithm can provide the encoding type and original content type to a corresponding XML reader. Thus, a base64 encoded XML element's value can be provided to a binary XML reader to decode the value into the corresponding unencoded XML element.

Message encapsulation facilitates the reuse of Web Services protocol elements between different messaging components that may have different communication parameters. For example, encapsulation facilitates the reuse of addressing, security, reliability, and transaction protocol elements between different applications and components. Thus, when a second SOAP message encapsulates a first SOAP message, composable protocol elements of the first SOAP message do not interfere with composable protocol elements of the second SOAP message (since the composable elements are encoded). Yet, composable protocol elements of the application SOAP envelope can be efficiently accessed through decoding.

Generally, a SOAP messaging encapsulating another SOAP message can be of the format:

```
<Envelope>
    <Header>
        Header Elements
    </Header>
    <Body>
        Body Elements
        <WrappedMessage WrappingType= " " ContentType="">
            wrapped message
        </WrappedMessage>
    <:Body>
<Envelope>
```

Message relay 104 can receive SOAP messages that contain electronic addresses, such as, for example, a Uniform Resource Identifier ("URI")), representing a destination for the received message. Message relay 104 can map an electronic address to an established connection for application inside firewall 107. When negotiated communication parameters for the inside application differ from those associated with the received SOAP message, message relay 104 can appropriately transform the received SOAP message for compatibility.

Relay component 112 is configured to receive messages for application 102B. Relay component 112 can be configured to transform messages in essentially the inverse of transforms implemented at message relay 104. Thus, relay component 112 can transform a transformed message back into an earlier format (e.g., the format when the message was received at message relay 104). Relay component 112 can then deliver the message to application 102B.

Relay component 112 can be configured to negotiate communication parameters with message relay 104 that are to be used when message relay 104 relays a message through firewall 107. Included in the negotiation, relay component 112 can establish a connection (e.g., a bidirectional connection) between message relay 104 and relay component 112 through firewall 107. Relay component 112 can include functionality to keep an established connection (e.g., connection 193) to message relay 104 alive. Although not required, keep alive mechanisms can be transport specific. For example, for an established TCP connection, relay component 112 can send "Keep Alive" packets to message rely 104 to keep a connection alive.

Relay component 112 can also send an electronic address (e.g., a URI) that corresponds to an established connection to message relay 104. For example, relay component 112 can send a URI that corresponds to connection 193 to message relay 104. Message relay 104 can maintain a name-connection mapping that maps the electronic address to the established connection. Message relay 104 can use the name-connection mapping to map received SOAP messages destined for the electronic address to the established connection (and thus through relay component 112 to application 102B).

Alternately, in different embodiments, message relay 104 can implement mailbox type functionality. In these different embodiments, message relay 104 can store (e.g., enqueue) received messages, such as, for example, message 103, in a specified location (e.g., a message queue) for message component 113. Thus, it is possible for message relay 104 to receive and store messages for relay component 112 even when relay component 112 is offline. From time to time, or when relay component 112 comes online, relay component 112 can request any queued messages from message relay 104. In response to the request, message relay 104 can access (e.g., dequeue) any received messages for relay component 112 and send the messages to relay component 112.

Figure 2:
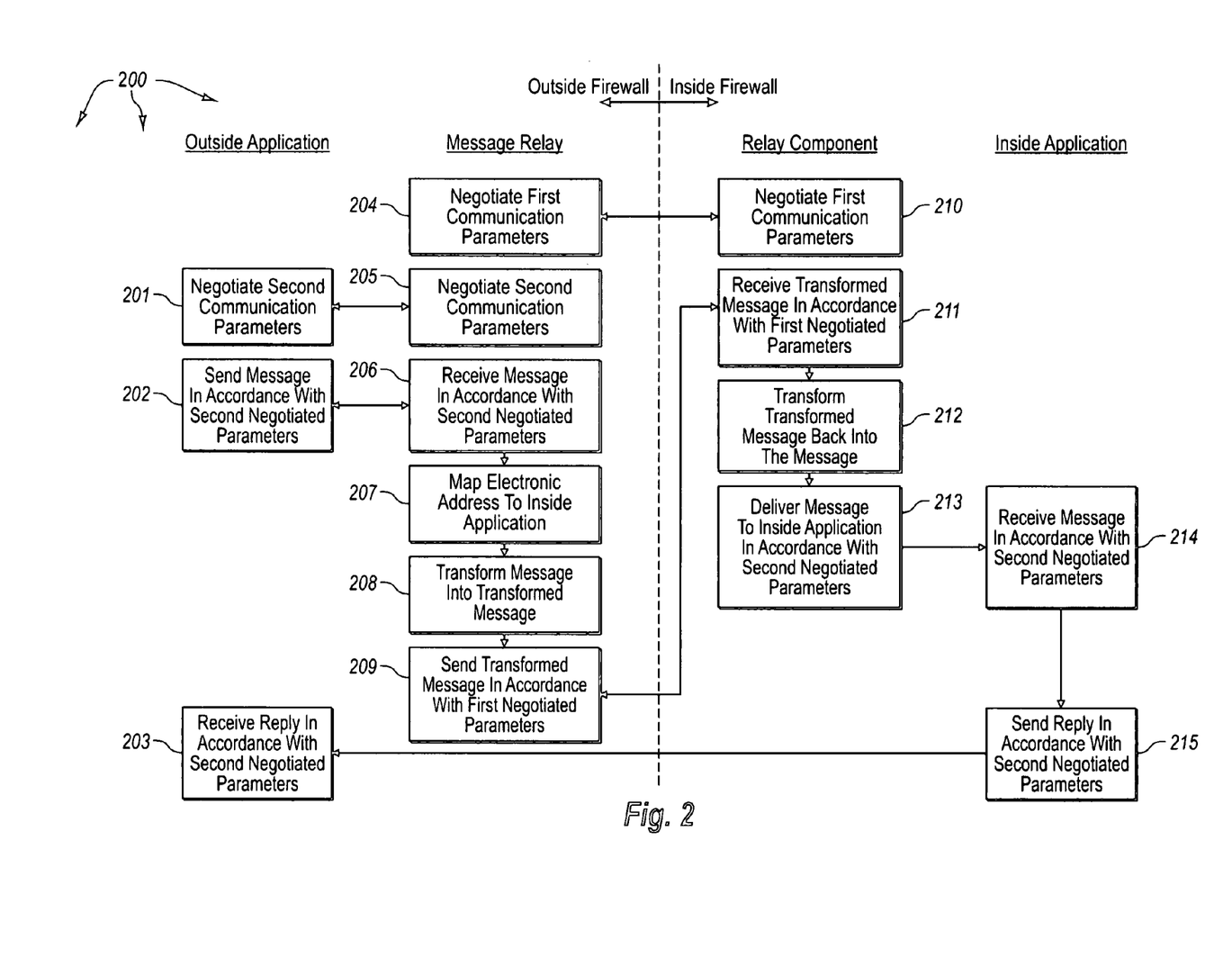
FIG. 2 illustrates an example flow chart of a method for relaying a message through a firewall.

FIG. 2 illustrates an example flow chart of a method 200 for relaying a message through a firewall. Method 200 will be described with respect to the components and data of computer architecture 100.

Method 200 includes an act of a message relay negotiating first communication parameters (act 204) and an act of a relay component negotiating first communication parameters (act 210). For example, message relay 104 and relay component 112 can conduct negotiation 192 to negotiate communication parameters for relaying messages through firewall 107. Negotiating communication parameters can include establishing a TCP session (or session of some other connection oriented protocol), negotiating security keys, negotiating what URI is mapped to a connection, etc. For example negotiation 192 can include relay component 112 establishing connection 193 (e.g., a bi-directional connection) between relay component 112 and message relay 104. Also included in negotiation 192, relay component 112 can send registration data (e.g., name-connection mapping 121) to message relay 104 to register to receive messages destined for a specified address (e.g., a URI). Message relay 104 can maintain name-connection mapping 121 to map subsequently received messages to connection 193.

Method 200 includes an act of an outside application negotiating second communication parameters (act 201) and an act of the message relay negotiating second communication parameters (act 205). For example, application 102A and message relay 104 can conduct negotiation 191 to establish communication parameters for transferring messages between application 102A and message relay 104.

It may be that during the creation and deployment of application 102A and message relay 104 some communication parameters were pre-determined. Thus, (potentially significantly) fewer communication parameters are negotiated during negotiation 191 than during negotiation 192. For example, negotiation 191 may include little more than establishing a TCP connection. In some embodiments, negotiation 191 does not even occur.

Method 200 includes an act of sending a message in accordance with the second negotiated parameters (act 202). For example, application 102A can send message 103 (a SOAP message) to message relay 104 in accordance with communication parameters negotiated during negotiation 191. As depicted, message 103 includes electronic address 122 (e.g., a URI) indicating a destination for message 103.

Method 200 includes an act of receiving a message in accordance with the second negotiated parameters (act 206). For example, message relay 104 can receive message 103 from application 102A in accordance with communication parameters negotiated during negotiation 191. Method 200 includes an act of mapping an electronic address to an inside application (act 207). For example, message relay 104 can utilize name connection mapping 121 to map address 122 to connection 193.

Method 200 includes an act of transforming the message into a transformed message (act 208). For example, message relay 104 can transform message 103 into transformed message 108 (e.g., another SOAP message) such that transformed message 108 can be sent to relay component 112 in accordance with the parameters negotiated during negotiation 192. In some embodiments, transformation includes switching message transports. For example, a message transport can be switched from HTTP to TCP. Thus, it may be that message 103 is transferred to message relay 104 using HTTP and transformed message 108 is transferred to relay component 112 using TCP.

In other embodiments, transformation includes encapsulating message 103 within transformed message 108. As depicted in transformed message 108, message 103 is indicated with a dashed line. The dashed line represents that message 103 is optionally included in message 108. As previously described, encapsulation allows the parameters associated with message 103 to be preserved without interfering with the parameters associated with transformed message 108. In embodiments that do not include encapsulation, transformed message 108 can be transformed from message 103 but does not necessarily include message 103.

Method 200 includes an act of sending the transformed message (act 209). For example, message relay 104 can send transformed message 108 through firewall 107 to relay component 112 in accordance with the parameters negotiated during negotiation 192. Transformed message 108 can be sent over connection 193. Since connection 193 was established from communication originating inside firewall 193 (i.e., from relay component 112), message 108 is allowed to pass through firewall 107.

Method 200 includes an act of receiving a transformed message (act 211). For example, relay component 112 can receive transformed message 108 from message relay 104. Transformed message 108 can be received through firewall 107 in accordance with the parameters negotiated during negotiation 192. Thus, communication parameters can be altered when a message is transferred through firewall 107.

Method 200 includes an act of transforming the transformed message back into the message (act 212). For example, relay component 112 can transform transformed message 108 back into message 103. When transformed message 108 encapsulates message 103, relay component 112 can remove the encapsulation to reveal message 103. For example, relay component 112 can unwrap any wrapped portions of message 108.

Method 200 includes an act of delivering the message to the inside application in accordance with the second negotiated parameters (act 213). For example, relay component 112 can deliver message 103 to application 102B in accordance with the parameters negotiated during negotiation 191. Method 200 includes an act of receiving the message in accordance with the second negotiated parameters (act 214). For example, application 102B can receive message 103 from relay component 112 in accordance with the parameters negotiated during negotiation 191. Thus, message 103 is sent from application 102A and received at application 102B in accordance with similar (and potentially the same) communication parameters.

Method 200 includes an act of sending a reply in accordance with the second negotiation parameters (act 215). For example, application 102B can send message 113 to application 102A in accordance with the parameters negotiated during negotiation 191. In some embodiments, message 103 can include a return address (e.g., a ReplyTo address) that allows application 102B to bypass relay component 112 and message relay 104 when sending a reply to application 102A. Further, since application 102B is inside firewall 107 message 113 (an outbound communication) can be sent through firewall 107 (without being blocked) to application 102A.

In other alternate embodiments, application 102A and application 102B exchange messages through connection bound bi-directional communication. Thus, any reply follows essentially the inverse path of message 103. For example, application 102B can send message 113 to relay component 112 in accordance with the parameters negotiated during negotiation 191. Relay component may or may not transform message 113 (since message 113 is outbound communication).

However, as depicted in computer architecture 100, relay component 112 transforms message 113 into transformed message 114, which may or may not encapsulate message 113. Relay component 112 sends transformed message 114 over connection 193 to message relay 104 in accordance with the parameters negotiated during negotiation 192. When message 113 is not transformed, relay component 112 can send message 113 over connection 193 to message relay 104 in accordance with the parameters negotiated during negotiation 191.

As depicted, message relay 104 receives transformed message 114 in accordance with the parameters negotiated during negotiation 192. Message relay 104 transforms message 114 back into message 113 and sends message 113 to application 102A in accordance with the parameters negotiated during negotiation 191. When message 113 is not transformed, message relay forwards message 113 to application 102A in accordance with the parameters negotiated during negotiation 191.

To facilitate delivery of replies back to an outside application, a message relay can maintain a mapping between a relay component connectionID and a connection to the outside application. A mapping between a relay component connectionID and a connection to the outside application can be of a format similar to the mapping from message address to connection that the relay maintains for inbound messages (e.g., similar to name-connection mapping 121). For example, message relay 104 can maintain a mapping between the connectionID for connection 193 and the connection to application 102B. When relay component 112 sends a message (e.g., message 114) to message relay 104, relay component 112 can include the connectionID for connection 193 in the message. Upon receiving the message, message relay 104 can access the connectionID and utilize the connectionID to identify a mapping to a connection for application 102B (e.g., from among any maintained mappings). Message relay 104 can then send the message over identified connection to application 102B.

Method 200 includes an act of receiving a reply in accordance with the second negotiation parameters (act 203). For example, application 102A can receive message 113 in accordance with the parameters negotiated during negotiation 191. In some embodiments, message 113 is received from application 102B. In connection bound bidirectional communication embodiments, message 113 is received from message relay 104.

Accordingly, embodiments of the present invention facilitate the relay of inbound communication from an application outside a firewall to an application inside the firewall. A message can be transformed to adhere to increased security parameters, relayed through the firewall, and then transformed back into an earlier form for delivery to an inside application. Thus, end-to-end communication between different portions of a distributed application (e.g., a Web service) can adhere to a first set of communication parameters. Yet, communication can still be transferred through a firewall in accordance with a second set of communication parameters (potentially causing transfer through the firewall to be more secure).

Embodiments of the present invention can be used to expose services hidden behind a firewall. For example, it may be that application 102A is a client and application 102B is a service. Application 102B (through relay component 112) can send a negotiated name to message relay 104 as its public name. When application 102B is up, it connects to message relay 104 (through relay component 112) and receives messages sent to its public name. When application 102B is not running, clients can receive an error.

Embodiments of the present invention can also be used to relay messages to long running clients behind a firewall. For example, it may be that application 102A is a server and application 102B is a client. Application 102B (through relay component 112) can send a negotiated name as a ReplyTo address in a conversation with application 102A thereby allowing application 102A to go away and comeback without affecting processing at application 102A.

An IRelayDeliver can be implemented in a RelayListenerFactory and called by a relay (e.g., message relay 104) to send messages to the RelayListenerFactory. The IRelayDeliver interface can be used to invoke different methods for message delivery through a firewall.

A DeliverOneWayMessage method can be invoked when a relay (e.g., message relay 104) is attempting to deliver a one way message. The original message (e.g., message 103) can be provided as a string input to the DeliverOneWayMessage method. For example, a call can be of the format DeliverOneWayMessage(string originalMessage)

A DeliverRequestReplyMessage method can be invoked when a relay is attempting to deliver a request-reply message. The original message and a request ID can be provided as string inputs to the DeliverRequestReplyMessage method. For example, a call can be of the format DeliverRequestReplyMessage (string requestID, string originalMessage). The request ID is an identifier that identifies the incoming request on the relay and can be contained in a requestID parameter.

A DeliverDuplexMessage method can be invoked when a relay is attempting to deliver a message received over a transport that is being used in duplex mode. The original message and a connection ID can be provided as string inputs to the DeliverRequestReplyMessage method. For example, a call can be of the format DeliverRequestReplyMessage (string connectionID, string originalMessage). The connection ID is an identifier that identifies the incoming connection on the relay and can be contained in a connectionID parameter.

An IRelayAdministration interface can be implemented by a relay component (e.g. relay component 112) and called by the RelayListenerFactory to perform other messaging operations. The IRelayAdministration interface can be used to invoke different methods that perform the other messaging operations.

A RegisterForMessages method can be invoked to attempt to register the underlying connection (e.g., connection 193) for receiving messages sent to the "address" url (e.g., address 122). An address can be provided as a Uri input to the RegisterForMessages method. For example, a call can be of the format RegisterForMessages (Uri address). The address can be the "To" of the incoming message for the message to be relayed to this client. Messages can be sent to the longest prefix match.

A SendReplyMessage method can be invoked to attempt to send messages back to the client for a connection bound request-reply channel. A request ID and outputMessage (e.g., message 113) can be provided as string inputs to the SendReplyMessage method. For example, a call can be of the format SendReplyMessage (string requestID, string outputMessage). The request ID can be the same UD that the relay supplied when it invoked DeliverRequestReplyMessage.

A SendOutputMessage method can be invoked to attempt to send messages back to the client for a connection bound duplex channel. A connection ID and outputMessage can be provided as string inputs to the SendOutputMessage method. For example, a call can be of the format SendOutputMessage (string connectionID, string outputMessage). The conenciton ID can be the same ID that the relay supplied when it invoked DeliverDuplexMessage.

A CloseRequest method can be invoked to close a specified request-reply at the relay. A request ID can be provided as string input to the CloseRequest method. For example, a call can be of the format CloseRequest (string request ED). The requestID is the id for the request that is being closed.

An AbortRequest method can be invoked to abort a specified request-reply at the relay. A request ID can be provided as string input to the AbortRequest method. For example, a call can be of the format AbortRequest (string request ID). The requestID is the id for the request that is being aborted.

A CloseChannel method can be invoked to close a specified connection bound channel at the relay. A connection ID can be provided as string input to the CloseChannel method. For example, a call can be of the format CloseChannel (string connection ID). The connectionID is the id for the connection that is being closed. This can be the same ID that the relay supplied when it invoked the DeliverRequestReplyMessage or DeliverDuplexMessage.

Figure 3:
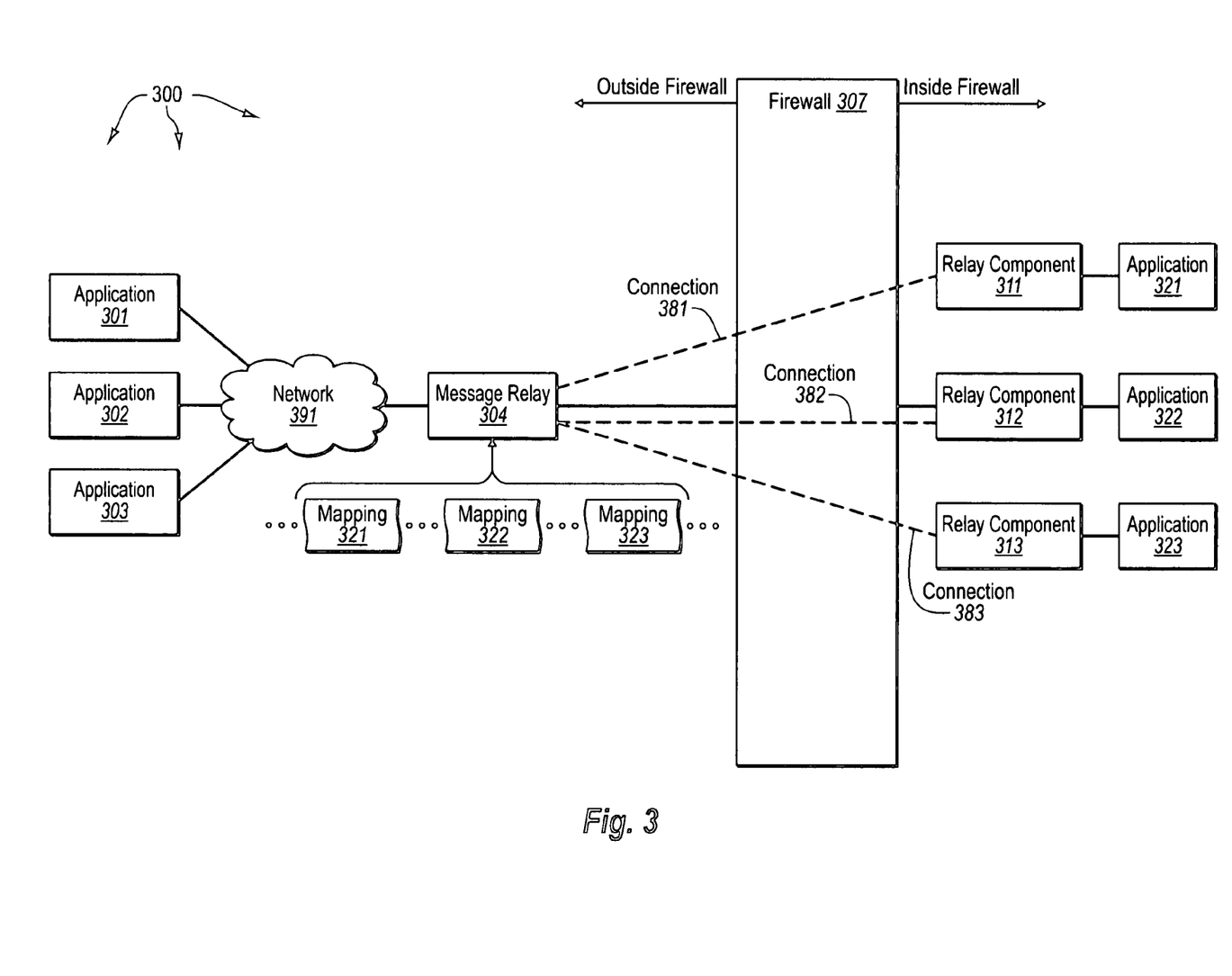
FIG. 3 illustrates an example of an alternate computer architecture that facilitates relaying messages through a firewall.

FIG. 3 illustrates an example of an alternate computer architecture 300 that facilitates relaying a message through a firewall. Depicted in computer architecture 300 are applications 301, 302, and 303, network 391 (e.g., the Internet), message relay 304, firewall 307, relay components 311, 312, and 313, and applications 321, 322, and 323.

Message relay 304 can be configured to negotiate communication parameters with applications 301, 302, 303 and to negotiate communication parameters with applications relay components 311, 312, and 313. When a message is received from one of applications 301, 302, 303 in accordance with first negotiated communication parameters, message relay 304 can transform the message (including encapsulating the message when appropriate) in accordance with second negotiated communication parameters. Message relay 304 can send the transformed message through firewall 307, over an established connection (e.g., any of connections 381, 382, and 383), to an appropriate relay component. Message relay 304 can refer to mappings 321, 322, and 323 to identify an appropriate relay component.

The appropriate relay component can transform the transformed message back into its previous form and deliver the message to the corresponding application (e.g., application 321, 322, or 323 respectively). A reply back to an outside application can occur as previously described. For example, a replay can be sent through firewall 307 directing to an application or can be sent using connection bound bi-directional communication. Thus, as depicted in computer architecture 300, message relay 304 functions as a message concentrator and/or multiplexer for a many to one or many to many relationship between outside applications and inside applications. For example, message relay 304 can multiplex multiple client conversations (e.g., a conversation for each of applications 301, 302, and 303) over the same connection (e.g., connection 383) from message relay 304 to a service (e.g., application 323). Accordingly, the overall number of connections can be reduced thereby conserving system and network resources.

Figure 4:
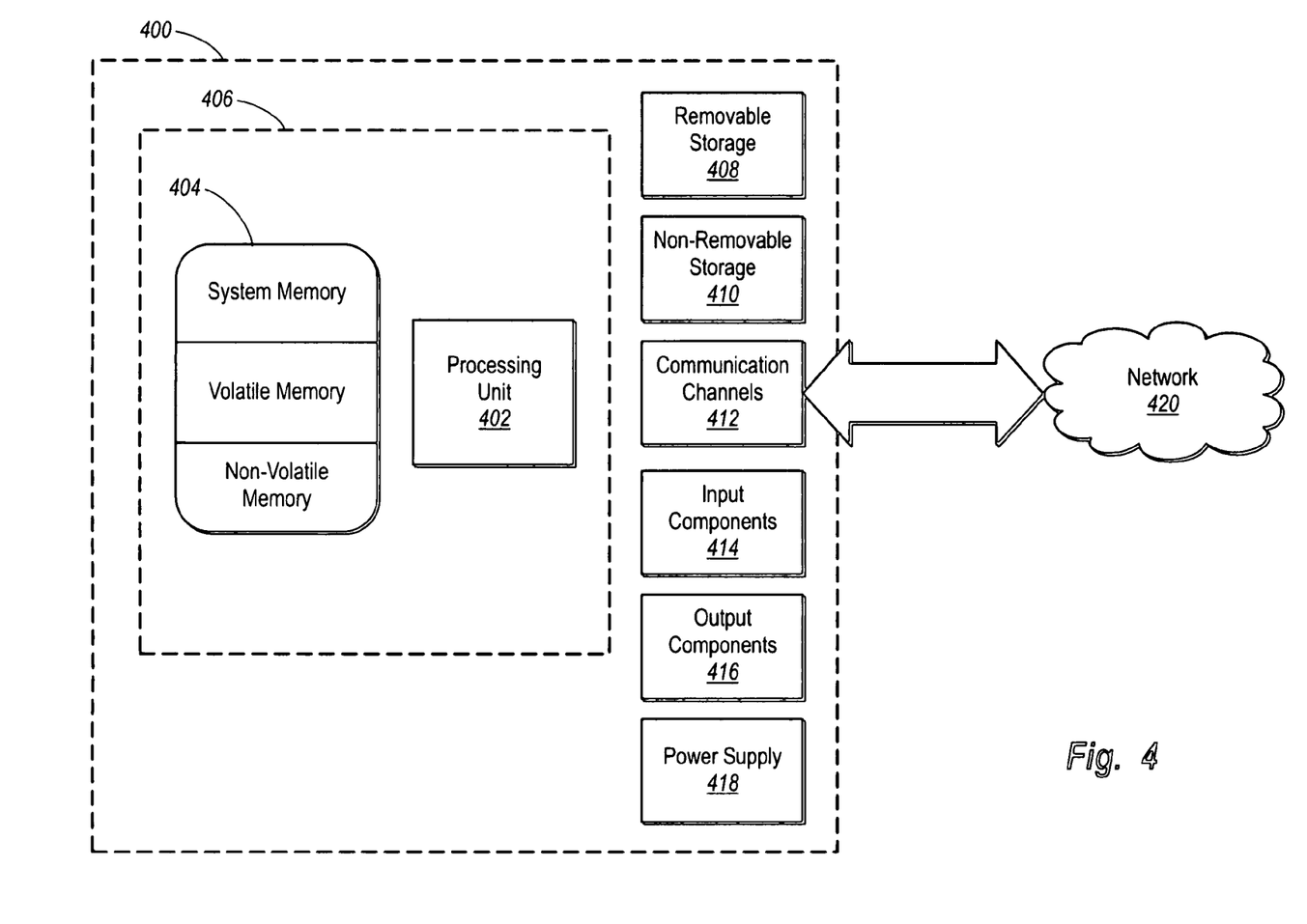
FIG. 4 illustrates a suitable operating environment for the principles of the present invention.

FIG. 4 illustrates a suitable operating environment for the principles of the present invention. FIG. 4 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

FIG. 4 depicts a schematic diagram of a computer system 400. Computer system 101 (FIG. 1) can include one or more of the components included in computer system 400. For descriptive purposes, the depicted computer system is only one example of a suitable environment and is not intended to suggest any limitation as to the scope of use or functionality of the invention. Neither should the computer systems be interpreted as having any dependency nor requirement relating to any one or combination of components illustrated in FIG. 4.

In some basic configurations, computer system 400 includes at least one processing unit 402 and memory 404.

The memory 404 may be volatile (such as RAM), non-volatile (such as ROM, flash memory, etc.), or some combination of the two. One basic configuration is illustrated in FIG. 4 by the dashed line 406.

Included storage media devices may have additional features and functionality. For example, they may include additional storage (removable and non-removable) including, but not limited to, PCMCIA cards, magnetic and optical disks, and magnetic tape. Such additional storage is illustrated in FIG. 4 by removable storage 408 and non-removable storage 410. Computer-storage media include volatile and non-volatile, removable and non-removable media implemented in any method or technology for storage of information such as computer-readable instructions, data structures, program modules, or other data. Memory 404, removable storage 408, and non-removable storage 410 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the Computer system 400 may also contain communication channels 412 that allow the host to communicate with other systems and devices over a network 420. Communication channels 412 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computer system 400 may also have input components 414 such as a keyboard, mouse, pen, a voice-input component, a touch-input device, and so forth. Output components 416 include screen displays, speakers, printer, etc., and rendering modules (often called "adapters") for driving them. The computer system 400 has a power supply 418. All these components are well known in the art and need not be discussed at length here.

While FIG. 4 represents a suitable operating environment for the present invention, the principles of the present invention may be employed in any system that is capable of, with suitable modification if necessary, implementing the principles of the present invention. The environment illustrated in FIG. 4 is illustrative only and by no means represents even a small portion of the wide variety of environments in which the principles of the present invention may be implemented.

In accordance with the present invention, modules including Web services, message relays, relay components, and firewalls, as well as associated data, including SOAP messages, name-connection mappings, and communication parameters, can be stored and accessed from any of the computer-readable media associated with computer system 400. When a mass storage device, such as, for example, non-removable storage 410, is coupled to computer system 400, such modules and associated program data may also be stored in the mass storage device. In a networked environment, program modules depicted relative to computer system 400, or portions thereof, can be stored in remote memory storage devices, such as, system memory and/or mass storage devices associated with remote computer systems. Execution of such modules may be performed in a distributed environment as previously described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired secured by United States Letters Patent is:

1. In a computing network that includes a first computer system located outside of a firewall, and a second computer system located inside the firewall, a computer program product comprising computer storage media containing computer-executable instructions for implementing a method of relaying messages through the firewall between a first relay component located outside the firewall and a second relay component located inside the firewall, and wherein the method is comprised of acts of: the first and second relay components negotiating a first set of communication parameters, the first set of communication parameters which are configured to control how the first relay component is to relay messages through the firewall to the second relay component, including relaying a message from an application running on a first computer system located outside the firewall to an application running on a second computer system located inside the firewall, and wherein the first set of communication parameters include one or more of the following parameters: encoding parameters, compression parameters, encryption parameters, transfer protocol parameters, security parameters, and ordering guarantee parameters; said first relay component and said application running on the first computer system negotiating a second set of communication parameters, the second set of communication parameters insufficient for communicating through the firewall, the second set of communication parameters reusing at least one parameter from the first set of communications parameters, the first set of parameters having a first value for the at least one reused parameter and the second set of parameters having a second different value for the at least one reused parameter; said first computing system sending the message to the first relay component in accordance with the second set of communication parameters, the message intended for delivery to the application running on the second computing system, prior to relaying the message through the firewall to the second relay component located inside the firewall, said first relay component configuring the message for relay through the firewall, including: transforming the message so that it conforms to the first set of communication parameters, transforming including: encoding the message and the second set of communication parameters into an encoded element to obscure the meaning of the second set of communication parameters, including the second value for the at least one reused parameter, from the firewall such that the second set of communication parameters can pass through the firewall for subsequent interpretation by the application running on the second computing system but are prevented from interfering with the firewall's interpretation of the first communication parameters; and encapsulating the encoded element in a second message, the second message configured in accordance with the first set of communication parameters, including the first value for the at least one reused parameter; and mapping the second message to an address for the application running on the second computing system inside the firewall; and the first relay component then sending the second message through the firewall to the second relay component located inside the firewall in accordance with the first set of communication parameters.

2. The computer program product as recited in claim 1, wherein the method further comprises:

an act of receiving at the first relay component registration data from the application running on the second computing system inside the firewall, the registration data indicating that the application running on the second computing system is to receive messages having a destination that corresponds to said address.

3. The computer program product as recited in claim 1, wherein the act of negotiating said second set of communication parameters comprises selecting the second set of communication parameters from among encoding parameters, compression parameters, encryption parameters, transfer protocol parameters, security parameters, ordering guarantee parameters, to be used for communication between the message relay and outside application.

4. The computer program product as recited in claim 1, wherein the act of sending said message configured in accordance with the second set of communication parameters comprises an act of sending a SOAP message that includes a URI indicating the destination for the SOAP message.

5. The computer program product as recited in claim 1, wherein the act of mapping the second message to an address for the application running on the second computing system inside the firewall comprises an act of mapping a URI to a connection through the firewall.

6. The computer program product as recited in claim 1, wherein the act of encapsulating the encoded element into a second message comprises an act of encapsulating a first SOAP message inside a second SOAP message.

7. The computer program product as recited in claim 1, wherein the first set of negotiated communication parameters define a communication protocol with increased security relative to the second set of negotiated communication parameters such that communication through the firewall has increased security.

8. In a computing network that includes a first computer system located outside of a firewall, and a second computer system located inside the firewall, a computer program product comprising computer storage media containing computer-executable instructions for implementing a method of relaying messages through the firewall between a first relay component located outside the firewall and a second relay component located inside the firewall, and wherein the method is comprised of acts of: the first and second relay components negotiating a first set of communication parameters, the first set of communication parameters to control how the first relay component is to relay messages through the firewall to the second relay component, including relaying a message from an application running on a first computer system located outside the firewall to an application running on a second computer system located inside the firewall, and wherein the first set of communication parameters include one or more of the following parameters: encoding parameters, compression parameters, encryption parameters, transfer protocol parameters, security parameters, and ordering guarantee parameters; said first relay component and said application running on the first computer system negotiating a second set of communication parameters, the second set of communication parameters insufficient for communicating through the firewall, the second set of communication parameters reusing at least one parameter from the first set of communications parameters, the first set of parameters having a first value for the at least one reused parameter and the second set of parameters having a second different value for the at least one reused parameter, the second set of relay components used in configuring messages sent from the application running at the first computing system to the first relay component; said second relay component receiving a message from the first relay component, the message having been relayed through the firewall in accordance with the first set of communication parameters, the message being mapped by the first relay component to an address for the application running on the second computing system inside the firewall, and transformed by the first relay component so that it conforms to the first set of communication parameters, including the first value for the at least one reused parameter, the transformation including: an encapsulated encoded element in the message, the encoded element representing another message sent from the application running on the first computer system to the first relay component in accordance with the second set of communication parameters, the encoded element obscuring the meaning of the second set of communication parameters, including the second value for the at least one reused parameter, from the firewall such that the second set of communication parameters can be passed through the firewall for subsequent interpretation by the application running on the second computing system without interfering with the firewall's interpretation of the first communication parameters, including the first value for the at least one reused parameter; and the second relay component then unwrapping the encoded element encapsulated in the received message to reveal the other message so that the other message conforms once again to the second set of communication parameters including the second value for the at least one reused parameter; the second relay component then delivering the other message to the application running on the second computing system located inside the firewall; and the second computing system then sending back to the first computing system a reply message configured in accordance with the second set of communication parameters.

9. The computer program product as recited in claim 8, wherein the method further comprises:

an act of establishing a connection between the second relay component and the first relay component through the firewall; and an act of sending registration data indicating that the application running on the second computing system inside the firewall is to receive messages having a destination that corresponds to said address.

10. The computer program product as recited in claim 8, wherein first message is a first SOAP message and the encoded element is a second SOAP message.

11. The computer program product as recited in claim 10, wherein unwrapping said received message comprises exposing said second SOAP message that was encapsulated in the first SOAP message.

12. The computer program product as recited in claim 8, wherein sending back to the first computing system a reply message comprises sending the reply message in accordance with connection bound bi-directional communication between the applications running at the first and second computing systems.

13. The computer program product as recited in claim 8, wherein the first set of negotiated communication parameters define a communication protocol with increased security relative to the second set of negotiated communication parameters such that communication through the firewall has increased security.

14. In a computing network that includes a first computer system located outside of a firewall, and a second computer system located inside the firewall, a computer program product comprising computer storage media containing computer-executable instructions for implementing a method of relaying messages through the firewall between a first relay component located outside the firewall and a second relay component located inside the firewall, and wherein the method is comprised of acts of: the first and second relay components negotiating a first set of communication parameters, the first set of communication parameters to control how the first relay component is to relay messages through the firewall to the second relay component, including relaying a message from an application running on a first computer system located outside the firewall to an application running on a second computer system located inside the firewall, and wherein the first set of communication parameters include one or more of the following parameters: encoding parameters, compression parameters, encryption parameters, transfer protocol parameters, security parameters, and ordering guarantee parameters; said first relay component and said application running on the first computer system negotiating a second set of communication parameters, the second set of communication parameters insufficient for communicating through the firewall, the second set of communication parameters reusing at least one parameter from the first set of communication parameters, the first set of communication parameters having a first value for the at least one common parameter and the second set of communication parameters having a second different value for the at least one common parameter; said first computing system sending the message to the first relay component in accordance with the second set of communication parameters, the message intended for delivery to the application running on the second computing system; prior to relaying the message through the firewall to the second relay component located inside the firewall, said first relay component configuring the message for relay through the firewall, including: transforming the message so that it conforms to the first set of communication parameters, transforming including: encoding the message and the second set of communication parameters into an encoded element to obscure the meaning of the second set of communication parameters, including the second value for the at least one reused parameter, from the firewall such that the second set of communication parameters can pass through the firewall for subsequent interpretation by the application running on the second computing system but are prevented from interfering with the firewall's interpretation of the first communication parameters, including the first value for the at least one reused parameter; and encapsulating the encoded element in a second message, the second message configured in accordance with the first set of communication parameters, including the first value for the at least one reused parameter; and mapping the second message to an address for the application running on the second computing system inside the firewall; and the first relay component then sending the second message through the firewall to the second relay component located inside the firewall in accordance with the first set of communication parameters, including the first value for the at least one reused parameter; the second relay component then unwrapping the encoded element form the second message to reveal the message so that the message conforms once again with the second set of communication parameters, including the second value for the at least one reused parameter; the second relay component then delivering the message to the application running on the second computing system located inside the firewall in accordance with the second set of communication parameters; the second computing system then sending back to the first computing system a reply message configured in accordance with the second set of communication parameters; and the first computing system thereafter receiving the reply message.

15. The computer program product of claim 14, wherein said the message is a first SOAP message and the second message is a second SOAP message so that composable protocol elements of the first SOAP message do not interfere with the composable protocol elements of the second SOAP message.

\* \* \* \* \*

UNITED STATES PATENT AND TRADEMARK OFFICE
CERTIFICATE OF CORRECTION

| | | |
|---|---|---|
| PATENT NO. | : 7,627,681 B2 | Page 1 of 1 |
| APPLICATION NO. | : 11/185347 | |
| DATED | : December 1, 2009 | |
| INVENTOR(S) | : Saurab Nog et al. | |

It is certified that error appears in the above-identified patent and that said Letters Patent is hereby corrected as shown below:

In column 11, line 49, delete "conenciton" and insert -- connection --, therefor.

In column 13, line 23, after "store the" insert -- desired information and that can be accessed by the computer system. --.

In column 16, line 50, in Claim 10, after "wherein" insert -- the --.

Signed and Sealed this
Eighteenth Day of January, 2011

David J. Kappos
*Director of the United States Patent and Trademark Office*